United States Patent
Faccin et al.

(10) Patent No.: US 7,266,593 B2
(45) Date of Patent: Sep. 4, 2007

(54) IP BASED SERVICE ARCHITECTURE

(75) Inventors: Stefano Faccin, Dallas, TX (US); Curt Wong, Plano, TX (US); Srinivas Shreemanthula, Arlington, TX (US); Jari Mutikainen, Irving, TX (US); Kengatharan Sivalingam, Irving, TX (US)

(73) Assignee: Nokia Networks Oy, Espoo (FI)

( * ) Notice: Subject to any disclaimer, the term of this patent is extended or adjusted under 35 U.S.C. 154(b) by 660 days.

(21) Appl. No.: 09/792,611

(22) Filed: Feb. 23, 2001

(65) Prior Publication Data

US 2002/0120759 A1 Aug. 29, 2002

(51) Int. Cl.
*G06F 13/00* (2006.01)

(52) U.S. Cl. ................... 709/220; 379/88.17
(58) Field of Classification Search ........ 709/220–222, 709/237, 230; 379/900, 88.17; 370/352, 370/353, 252, 253
See application file for complete search history.

(56) References Cited

U.S. PATENT DOCUMENTS

| 6,009,468 | A | | 12/1999 | Lau et al. | |
|---|---|---|---|---|---|
| 6,009,469 | A | * | 12/1999 | Mattaway et al. | 709/227 |
| 6,161,134 | A | * | 12/2000 | Wang et al. | 709/220 |
| 6,373,817 | B1 | * | 4/2002 | Kung et al. | 370/217 |
| 6,600,736 | B1 | * | 7/2003 | Ball et al. | 370/352 |
| 6,625,141 | B1 | * | 9/2003 | Glitho et al. | 370/352 |
| 6,678,265 | B1 | * | 1/2004 | Kung et al. | 370/352 |
| 6,741,586 | B1 | * | 5/2004 | Schuster et al. | 370/352 |
| 6,757,266 | B1 | * | 6/2004 | Hundscheidt | 370/328 |
| 2003/0014668 | A1 | * | 1/2003 | Faccin et al. | 713/201 |

FOREIGN PATENT DOCUMENTS

| WO | 00/79741 | 12/2000 |
|---|---|---|
| WO | 00/79756 | 12/2000 |

OTHER PUBLICATIONS

Ismail Dalgic et al.; True Number Portability and Advanced Call Screening in a SIP-Based IP Telephony System; IEEE Communications Magazine; vol. 37, Issue 7; pp. 96-101; Jul. 1999.*
M.L.F. Grech; Providing Seamless Services for VOIP Moble Data Networks Using CAMEL/IN Concepts; Fifth International Conference on 3G Mobile Communication Technologies, 2000; pp. 133-137; Mar. 2000.*
Wanjuin Liao; Mobile Internet Telephony Protocol; An Application Layer Protocol for Mobile Internet Telephony Services; IEEE International Conference on Communications, 1999; pp. 339-343; Jun. 1999.*

(Continued)

*Primary Examiner*—Kenneth R. Coulter
(74) *Attorney, Agent, or Firm*—Squire, Sanders & Dempsey (57) ABSTRACT

A communication system comprises an IP network offering services to users and an IPT provider network providing call related functions to users. A control protocol message is received and analyzed by a respective serving entity in the IPT provider network. Depending on the analyzing result, call related functions are performed by the respective serving entity. Moreover, a received control protocol message is analyzed by the IP network and, depending on the analyzing result, services are executed by the IP network.

59 Claims, 8 Drawing Sheets

OTHER PUBLICATIONS

Lionel Morand et al.; VHE Trial over Mobile IP; 2000 IEEE Service Portability and Virtual Customer Environments; pp. 79-84; Dec. 2000.*

Bourabid El Ouahidi et al.; The Internet is Challenging the Intelligent Network; Fifth IEEE Symposium on computers and Communications, 2000; pp. 800-805; Jul. 2000.*

Delphine Plasse; Call Control Scenarios in the "all-IP" UMTS Core Network; The 11th IEEE International Symposium on Personal, Indoor and Mobile Radio Communications, 2000; pp. 322-326; Sep. 2000.*

Farooq Anjum et al.; ChaiTime: A System for Rapid Creation of Portable Next-Generation Telephony Services Using Third-Party Software Components; IEEE Second Conference on Open Architectures and Network Programming Proceedings, 1999; pp. 22-31; Mar. 1999.*

Henning Schulzrinne et al.; Signaling for Internet Telephony; Sixth International Conference on Network Protocols, 1998; pp. 298-307; Oct. 1998.*

Schulzrinne et al., "The Session Initiation Protocol: Providing Advanced Telephony Services Across the Internet", Bell Labs Technical Journal, vol. 3, No. 4, Oct. 1998, pp. 144-160.

Gurbani, V., "Accessing IN services from SIP networks", Internet Draft, Nov. 2000.

International Search Report for PCT/EP02/01908.

Canadian Office Action dated Mar. 20, 2006.

T. Suzuki, et al., "Media Control Technique in the Coming Generation Core Network", Jan. 2001, NTT Technical Journal, vol. 13, No. 1, pp. 69-75 (with partial English translation).

S. Suzuki, "Service Control Architecture to Offer Information Circulating Service IP System, High-Degree IN and Service Agent", Jan. 2001, NTT Technical Journal, vol. 13, No. 1, pp. 82-85 (with partial English translation).

English translation of a Japanese Office Action dated Oct. 25, 2005.

* cited by examiner

IP BASED SERVICE ARCHITECTURE

FIELD OF THE INVENTION

The present invention relates to an IP (Internet Protocol) based service architecture (IPSA).

BACKGROUND OF THE INVENTION

A telephony service provider today provides all the end-user supplementary telephony services. An end-user with multiple telephone subscriptions must configure the supplementary services associated with each subscription separately even though many of the services are the same, such as the service "Call forwarding if no answer".

SUMMARY OF THE INVENTION

Therefore, it is an object of the present invention to avoid the necessity of configuring services for each subscription.

According to a first aspect of the present invention, this object is achieved by a communication system comprising an IP network offering services to users and an IPT (Internet Protocol Telephony) provider network providing call related functions to users. The IPT provider network comprises serving entities which are arranged to receive a control protocol message, analyze the control protocol message, and, depending on the analyzing result, perform call related functions. The IP network is arranged to receive a control protocol message, analyze the control protocol message and, depending on the analyzing result, execute services.

According to a second aspect, the above-mentioned object is achieved by a method of communicating in a communication system which comprises an IP network offering services to users and an IPT provider network providing call related functions to users. According to the method, a control protocol message is received by a respective serving entity in the IPT provider network, the received control protocol message is analyzed by the respective serving entity, and, depending on the analyzing result, call related functions are performed by the respective serving entity. In addition, a received control protocol message is analyzed by the IP network, and, depending on the analyzing result, services are executed by the IP network.

According to a third aspect, the above-mentioned object is achieved by a user equipment for communicating in the communication system, wherein the user equipment is arranged to use control protocol methods for attaching to the system.

According to a fourth aspect, the above-mentioned object is achieved by a serving entity in an IPT provider network providing call related functions to users and communicating with an IP network offering services to users. The serving entity is arranged to receive a control protocol message, analyze the control protocol message, and, depending on the analyzing result, perform call related functions.

According to a fifth aspect, the above-mentioned object is achieved by an IP network offering services to users and communicating with an IPT provider network providing call related functions to users. The IP network is arranged to receive a control protocol message, analyze the control protocol message and, depending on the analyzing result, execute services.

Further features of the present invention are defined in the dependent claims.

According to the present invention, a service provider network (IP network) and a telephony provider network (IPT provider network) are separated in an IPT (IP Telephony) environment. This separation allows an end-user to have the same services across multiple subscription networks. In other words, with this architecture, an end-user has to customize just one set of services and apply them all to his telephony subscriptions. This allows the end-user to manage his services in a centralized manner instead of customize each set of services individually with each telephony provider.

According to preferred embodiments of the present invention, the IP network is called IPSA network and the functions of the IPT provider network are implemented in a so called SIP network. In this communication system, SIP calls can be flexibly routed when the IPSA network is involved, wherein the IPSA network does not require any a priori knowledge of a SIP proxy address. In other words, there is no requirement of an a priori agreement between the SIP call/routing control network and the IPSA network.

In the following the present invention will be described by way of preferred embodiments thereof with reference to the accompanying drawings.

DESCRIPTION OF THE PREFERRED EMBODIMENTS

The idea of the present invention is to separate a service provider network from a bearer provider network in an IPT (Internet Protocol Telephony) environment. According to preferred embodiments of the present invention, which are to be described in the following, this concept is realized by using SIP (Session Initiation Protocol) as a control protocol between an IP network called IPSA (IP based Services Architecture) network, an IPT provider network called SIP network and an end-user terminal (user equipment).

Figure 1:
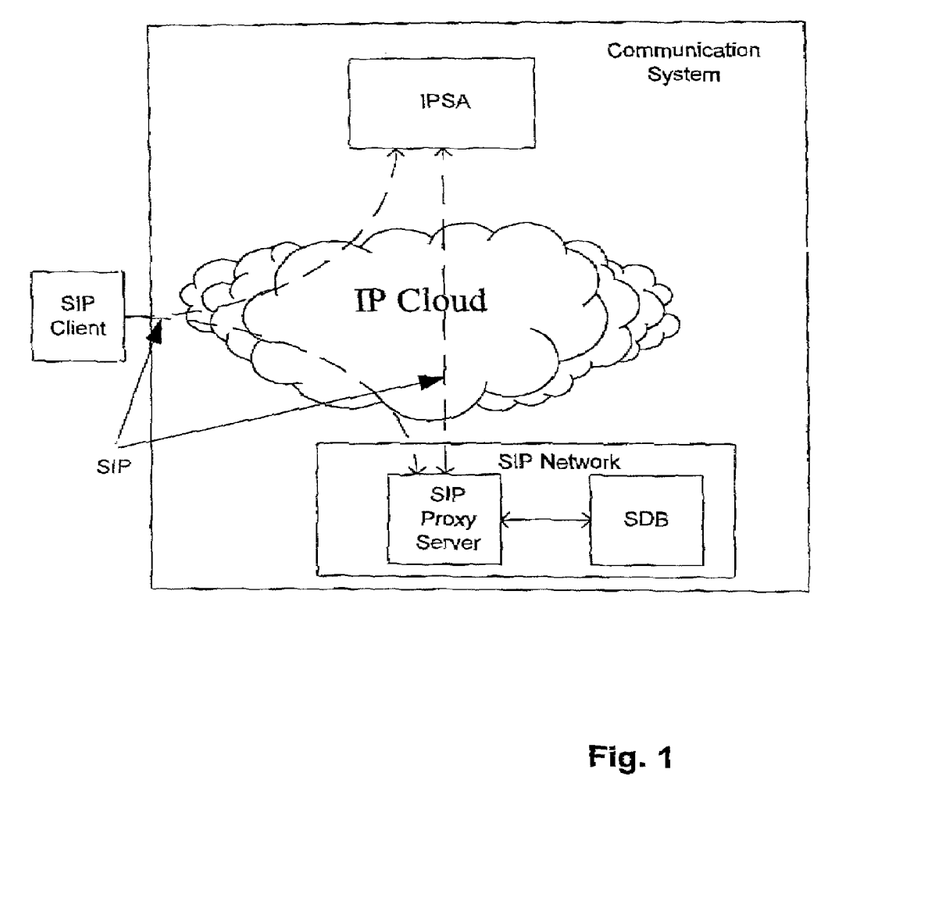
FIG. 1 shows a diagram illustrating functional elements involved in service triggering and control in a communication system according to an embodiment of the present invention.

In FIG. 1, functional elements involved in service triggering and control in the communication system according to an embodiment are shown. A SIP client represents an end-user's terminal attaching to the communication system using SIP methods. The end-user's terminal may be called user equipment (UE) and, for example, may be a PC (Personal Computer) or laptop running an IPT SIP client application.

A SIP proxy server is part of the SIP network that provides bearer connection and call related functions like call routing capabilities to the end-user. In the SIP network, an SDB (Subscriber Database) may be present, which contains subscriber subscription information such as authentication data and IPSA-ID (IPSA-Identifier).

The IPSA network shown in FIG. 1 is an IP based service architecture platform that offers services like telephony and other IP type of services to the end-user. A user has a unique identity called IPSA-ID within one IPSA cloud. The ID may be formed out of the user name and IPSA provider's domain name as ipsa-user@ipsa-provider.com.

An IP cloud shown in FIG. 1 represents an IP backbone network to interconnect the SIP client, SIP network and IPSA network.

Figure 2:
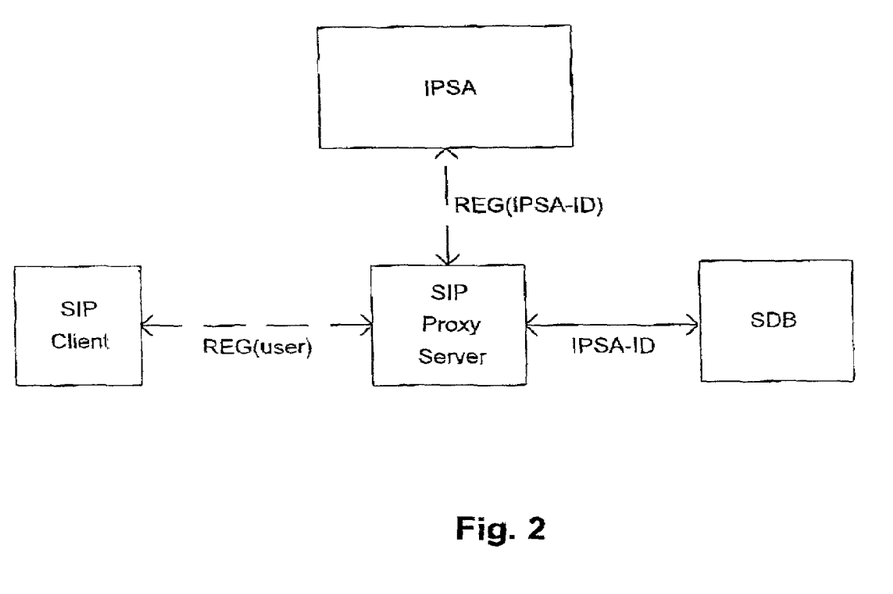
FIG. 2 shows a diagram illustrating a registration to an IPSA network according to an embodiment of the present invention.
Figure 3:
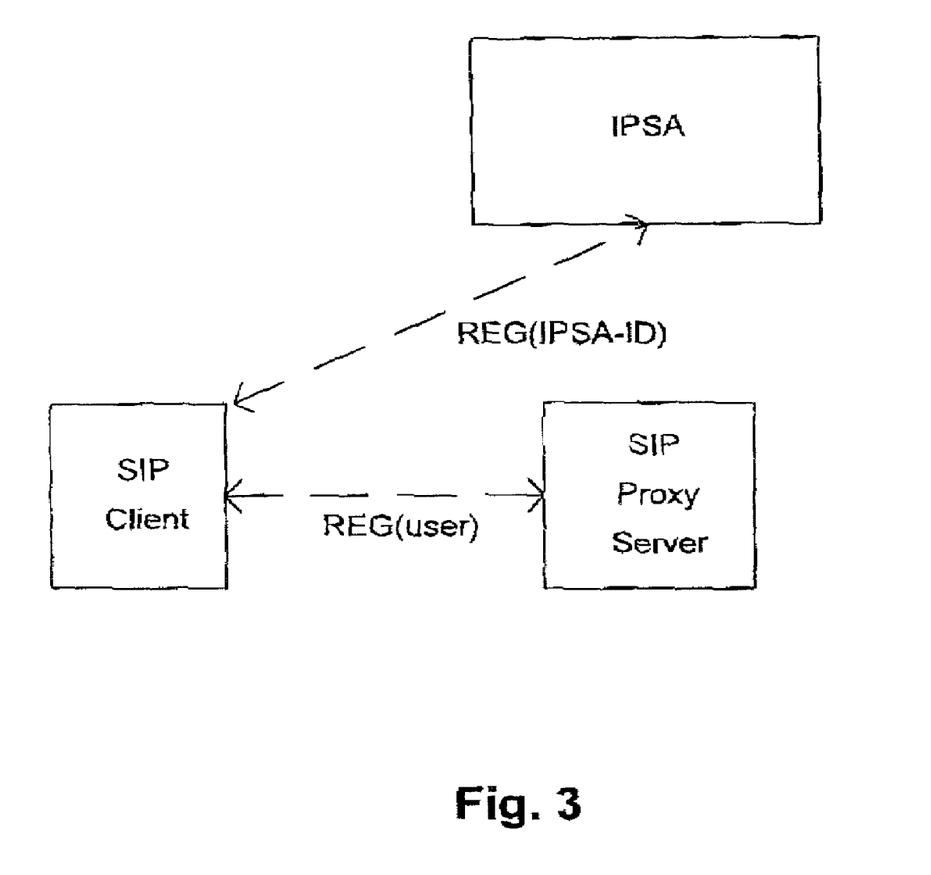
FIG. 3 shows a diagram illustrating a registration to an IPSA network according to another embodiment of the present invention.

FIGS. 2 and 3 illustrate a registration of a SIP client to the communication system, and in particular to the IPSA network shown in FIG. 1.

Some services such as "Presence" need to know whether the client's terminal is ready to receive a call or not, i.e. whether the client is attached to the network or not. When this type of service is implemented in IPSA, the IPSA network needs to know the status of the client.

FIG. 2 shows a first way of registering an end-user to the IPSA network. In this way of registering, the SDB contains an IPSA-ID in the form of a logical name at some domain, for examples "john.doe@some.ipsa.com". Whenever the SIP client sends a SIP REGISTER message to the SIP proxy server, the SIP proxy server registers the SIP client to the SIP network and also fetches an IPSA-ID for the end-user represented by the SIP client from the SDB. If an IPSA-ID in the SDB is associated with the end-user, the SIP proxy server generates another REGISTER message with the IPSA-ID and sends it towards the IPSA network. On the basis of this register message, the IPSA network is able to register the SIP client.

FIG. 3 shows another possibility of registering an end-user to the IPSA network. In this way of registering, the SIP client directly registers to the IPSA network using its IPSA-ID in another REGISTER message.

Option 1 shown in FIG. 2 allows the IPT provider to retain the control of which IPSA provider is providing the end-user's services, while option 2 shown in FIG. 3 gives total control to the user with respect to the choice of the IPSA provider.

Figure 4:
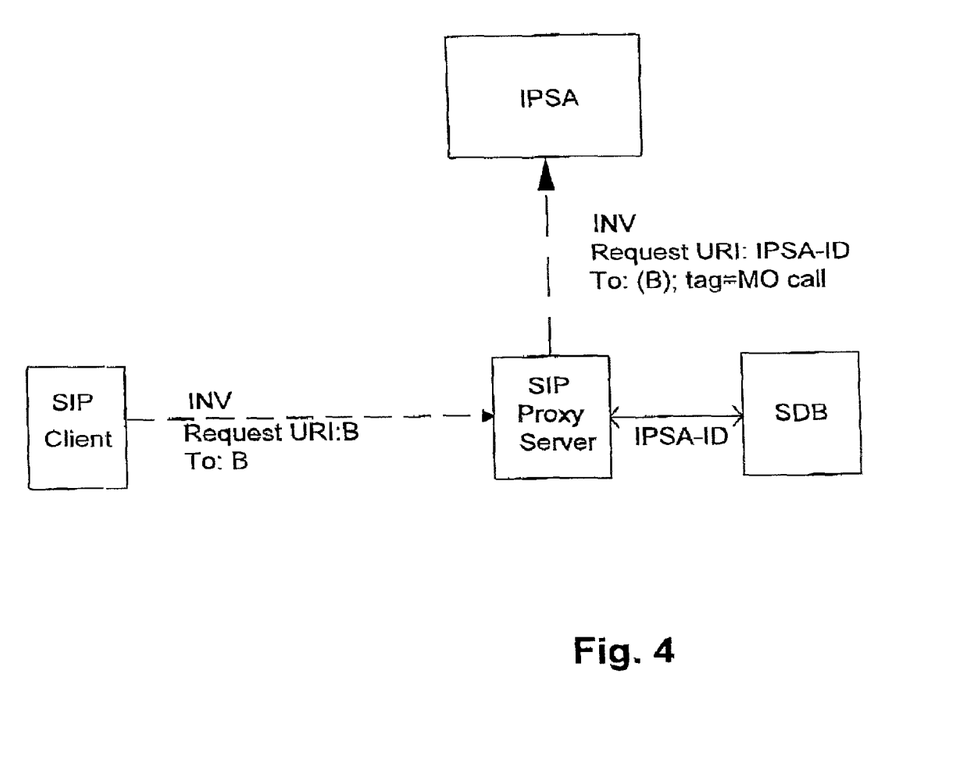
FIG. 4 shows a diagram illustrating an IPSA invocation on the basis of an originating call according to an embodiment of the present invention.

Next, an IPSA invocation on the basis of an originating call will be described. FIG. 4 shows a first method of invoking IPSA on the basis of an originating call. A SIP client sends an INVITE message towards the SIP network, which message is received by a SIP proxy server. The SIP proxy server can route this end-user initiated call towards the IPSA network when an IPSA-ID found in the SDB is associated with the called party B, i.e. with the request URI (Uniform Resource Identifier) B in the INVITE message. When the IPSA-ID is found in the SDB, the SIP proxy server changes the request URI to IPSA-ID and indicates that this is an originating call in a new SIP header and routes the INVITE message to the IPSA network.

Figure 5:
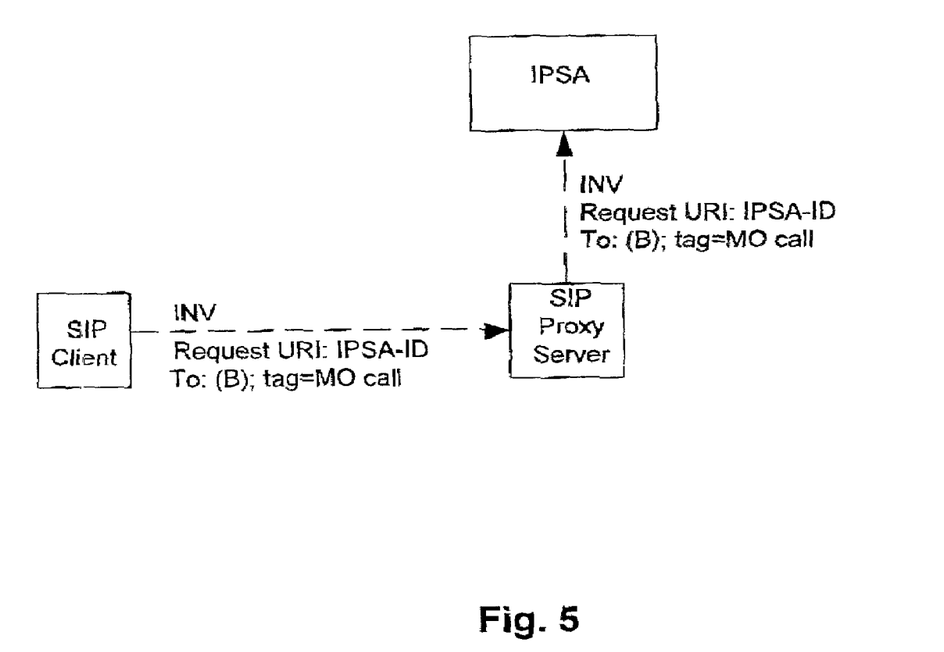
FIG. 5 shows a diagram illustrating an IPSA invocation on the basis of an originating call according to another embodiment of the present invention.

Optionally, as shown in FIG. 5, the SIP client can also send the INVITE message directly to the IPSA network via the SIP proxy server by indicating the request URI with an IPSA-ID of the called party. The SIP proxy server then analyses the request URI and forwards the INVITE message to the IPSA network.

Figure 6:
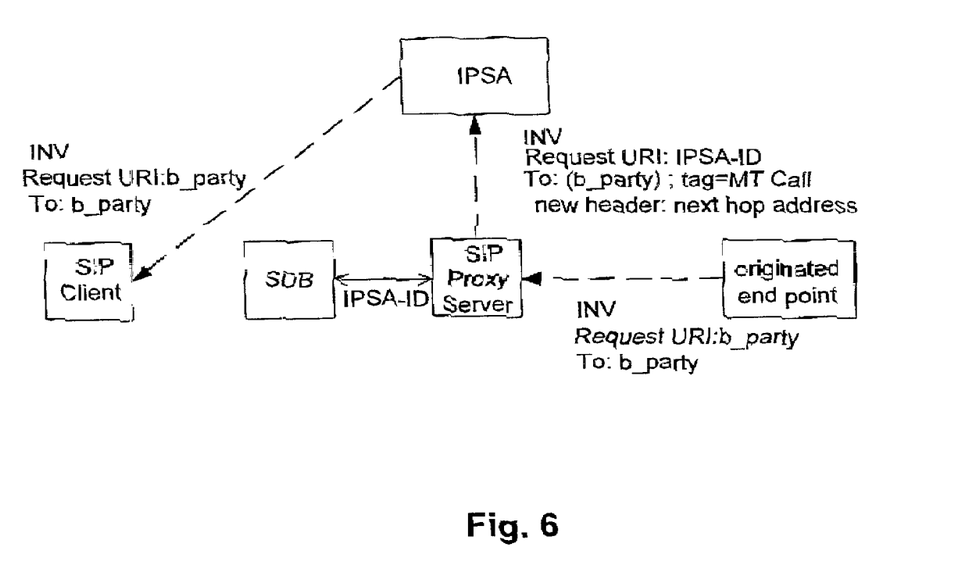
FIG. 6 shows a diagram illustrating an IPSA invocation on the basis of a terminating call according to an embodiment of the present invention.

Next, an IPSA invocation on the basis of a terminating call will be described. FIG. 6 shows a first method of invoking IPSA on the basis of a terminating call. When a SIP proxy server receives an INVITE message from an originated end-point inviting a SIP client called b_party to a call, it fetches an, IPSA-ID for the called b_party from the SDB. If an IPSA-ID is associated with the called b_party, the SIP proxy server routes the INVITE message to the IPSA network, using the fetched IPSA-ID along with a new SIP header indicating that this is a terminating call. The SIP proxy server further includes a Gateway SIP proxy address or hop address in the routers INVITE message, which will be described in greater detail in connection with FIG. 8. The IPSA network should use this address for further routing. The IPSA network then executes any terminating services, and if further routing is needed, it uses the address provided by the SIP proxy server to reach the end-user, i.e. the b_party.

Figure 7:
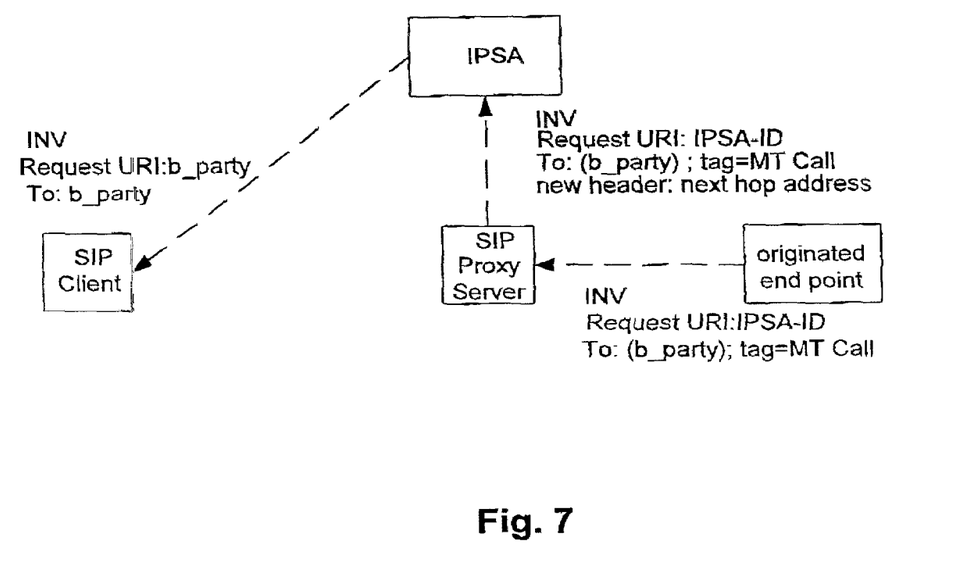
FIG. 7 shows a diagram illustrating an IPSA invocation on the basis of a terminating call according to another embodiment of the present invention.

Optionally, as shown in FIG. 7, the INVITE message received by the SIP proxy server already contains the IPSA-ID in the request URI as well as the terminated call indication. After having analyzed the request URI, the SIP proxy server adds the hop address for further routing to the INVITE message and forwards it to the IPSA network.

Figure 8:
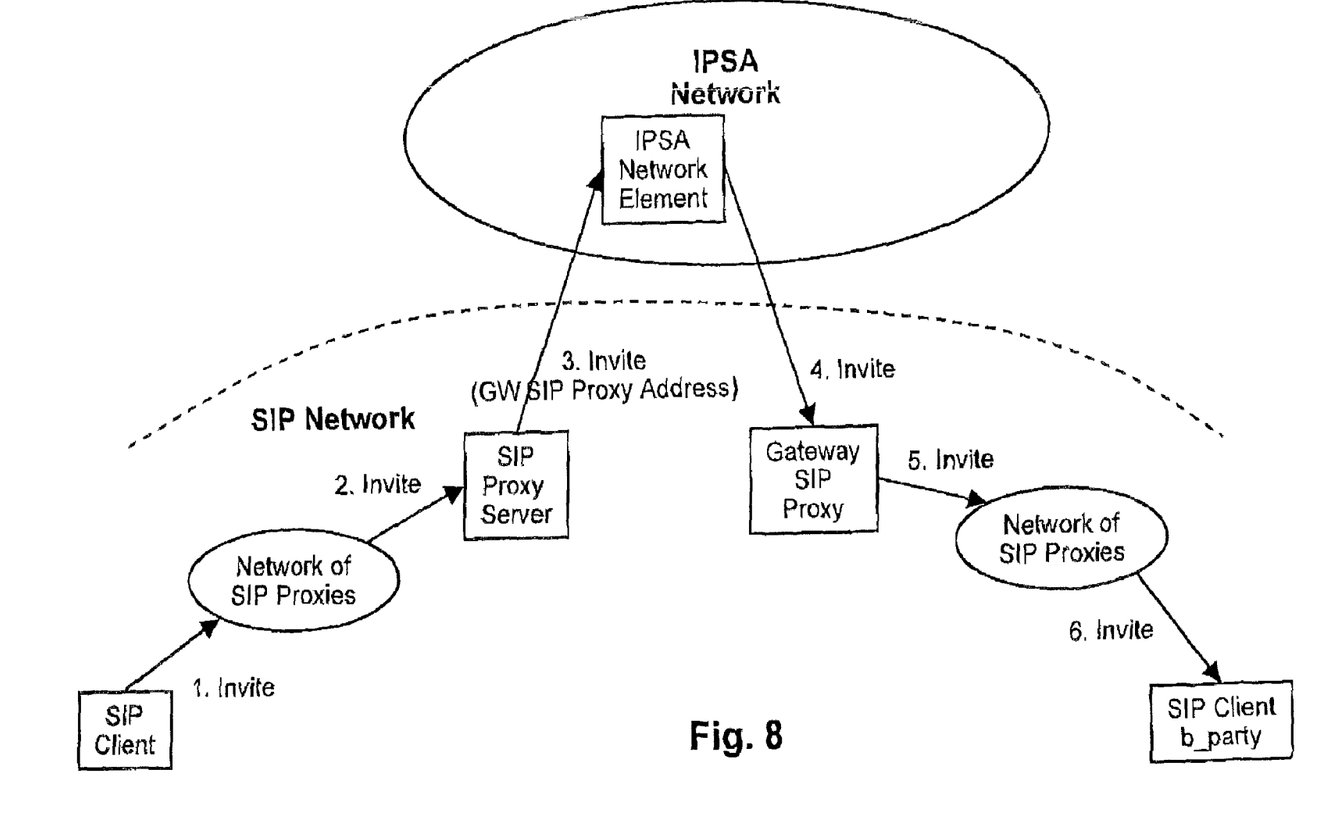
FIG. 8 shows a diagram illustrating routing of SIP calls from a SIP network to an IPSA network and from the IPSA network to the SIP network in greater detail.

Now referring to FIG. 8, a mechanism for appropriately routing service invocations between the IPSA network and the SIP network is described.

When the SIP network re-routes SIP calls to the IPSA network in order to have services executed for the subscriber or SIP client involved in the call, the IPSA network may have, as part of service execution, to re-route the SIP call or initiate a new SIP signaling, e.g. call setup, INFO methods, etc., through the SIP network. For example, considering a loop detection for INVITE messages, the SIP signaling cannot be sent back to the element in the SIP network that routed the call to the IPSA network and the IPSA network does not necessarily know the topology of the SIP network.

When a SIP proxy server in the SIP network routes a SIP call to the IPSA network, the SIP network provides an address of a SIP proxy in the SIP network to be used as a gateway for SIP signaling which the IPSA network needs to exchange with the SIP network.

For example, according to FIG. 8, a SIP client sends an INVITE message to the SIP network for inviting another SIP client (b_party). The INVITE message is received by a SIP proxy server via a network of SIP proxies forwarding the message. The SIP proxy server routes the INVITE message towards the IPSA network and indicates a gateway SIP proxy address in the message. Now, an IPSA network element receiving the message knows to which SIP proxy server in the SIP network the call has to be routed in order to reach the b_party. Hence, the IPSA network element routes the INVITE message to the gateway SIP proxy, the address of which has been indicated by the SIP proxy server. The b_party receives the INVITE message from the gateway SIP proxy via the network of SIP proxies.

The provision of the gateway address to the IPSA network can be implemented by adding a parameter in an SDP (Session Description Protocol) descriptor contained in the SIP message routed from the SIP proxy server to the IPSA network and containing the address of the gateway SIP proxy. Alternatively, the address can be indicated to the IPSA network by adding a SIP header to the SIP message routed from the SIP proxy server to the IPSA network and containing the address of the gateway SIP proxy.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

The invention claimed is:

1. An Internet Protocol communication system comprising:
a service provider network configured to offer services to users, wherein the service provider network is an Internet Protocol network; and
a bearer provider network configured to provide call related functions to users, wherein the bearer provider network is an Internet Protocol Telephony provider network, the service provider network being separate from the bearer provider network to allow the users to manage the services in a centralized manner across multiple bearer provider networks, the bearer provider network comprising serving entities which are configured to receive a control protocol message, analyze the control protocol message, and, depending on the analyzing result, perform call related functions, wherein
the service provider network is configured to receive a control protocol message, analyze the control protocol message and, depending on the analyzing result, execute services,
the bearer provider network comprises a subscriber database containing subscriber subscription information,
when a respective serving entity receives a control protocol message indicating an initiated call to a user equipment, it analyzes the control protocol message and, if a user address is present in the control protocol message, fetches a service provider network user identification address related to the user address from the subscriber database and sends a control protocol message with the service provider network user identification address and a terminating call indication towards the service provider network, and
the respective serving entity indicates an address of another serving entity in the bearer provider network in the control protocol message indicating the initiated call and sent to the service provider network, and the service provider network uses the other serving entity when routing the call towards the user equipment.

2. A system according to claim 1, wherein, when a respective serving entity receives, from a user equipment, a control protocol message for registering the user equipment, it analyzes a user address in the control protocol message, and registers the user equipment to the bearer provider network in accordance with the user address.

3. A system according to claim 2, wherein, when the service provider network receives, from the user equipment, another control protocol message for registering the user equipment, it analyzes a service provider network user identification address in the control protocol message, and registers the user equipment to the service provider network in accordance with the service provider network user identification address.

4. A system according to claim 1, wherein, when a respective serving entity receives, from a user equipment, a control protocol message for registering the user equipment, it analyzes a user address in the control protocol message, registers the user equipment to the bearer provider network in accordance with the user address, fetches a service provider network user identification address related to the user address from the subscriber database and generates a control protocol message with the service provider network user identification address and sends it to the service provider network for registering the user equipment to the service provider network.

5. A system according to claim 1, wherein, when a respective serving entity receives, from a user equipment, a control protocol message for initiating a call, it analyzes the control protocol message and, if a service provider network user identification address of a called party and an originating call indication are present in the control protocol message, forwards the control protocol message to the service provider network.

6. A system according to claim 1, wherein, when a respective serving entity receives, from a user equipment, a control protocol message for initiating a call, it analyzes the control protocol message and, if a called party address is present in the control protocol message, it fetches a service provider network user identification address related to the called party address from the subscriber database and sends a control protocol message with the service provider network user identification address and an originating call indication towards the service provider network.

7. A system according to claim 6, wherein the respective serving entity adds a new control protocol header comprising the originating call indication to the control protocol message.

8. A system according to claim 1, wherein the service provider network, upon receiving the control protocol message sent from the respective serving entity, executes terminating services.

9. A system according to claim 1, wherein the respective serving entity indicates the address of the other serving entity by adding a parameter containing the address to a descriptor contained in the control protocol message indicating the initiated call which is sent towards the service provider network.

10. A system according to claim 1, wherein the respective serving entity indicates the address of the other serving entity by adding a control protocol header containing the address to the control protocol message indicating the initiated call which is sent towards the service provider network.

11. A system according to claim 1, wherein the respective serving entity adds a new control protocol header comprising the terminating call indication to the control protocol message sent to the service provider network.

12. A system according to claim 1, wherein the control protocol comprises a session initiation protocol.

13. A user equipment for communicating in a communication system according to claim 1, wherein the user equipment is configured to use control protocol methods for attaching to said system.

14. A user equipment according to claim 13, wherein the user equipment is configured to use a control protocol message for registering to said system.

15. A user equipment according to claim 14, wherein the user equipment sends a control protocol message with a user address towards the bearer provider network for registering to the system.

16. A user equipment according to claim 14, wherein the user equipment sends a control protocol message with a user address towards the bearer provider network and another control protocol message with a service provider network user identification address related to the user address to the service provider network for registering to the system.

17. A user equipment according to claim 13, wherein the user equipment is configured to send a control protocol message towards the system for initiating a call.

18. A user equipment according to claim 17, wherein the user equipment sends a control protocol message for initiating a call comprising a service provider user identification address of a called party and an originating call indication towards the bearer provider network.

19. A user equipment according to claim 17, wherein the user equipment sends a control protocol message for initiating a call comprising an address of a called party towards the bearer provider network.

20. A user equipment according to claim 13, wherein the user equipment is configured to receive a control protocol message initiated from another party to invite the user equipment to a call from the system.

21. A user equipment according to claim 13, wherein the control protocol comprises a session initiation protocol.

22. An Internet Protocol communication system comprising:
   a service provider network configured to offer services to users, wherein the service provider network is an Internet Protocol network; and
   a bearer provider network configured to provide call related functions to users, wherein the bearer provider network is an Internet Protocol Telephony provider network, the service provider network being separate from the bearer provider network to allow the users to manage the services in a centralized manner across multiple bearer provider networks, the bearer provider network comprising serving entities which are configured to receive a control protocol message, analyze the control protocol message, and, depending on the analyzing result, perform call related functions, wherein
   the service provider network is configured to receive a control protocol message, analyze the control protocol message and, depending on the analyzing result, execute services,
   when a respective serving entity receives a control protocol message indicating an initiated call to a user equipment, it analyzes the control protocol message, and, if a user identification address and a terminating call indication are present in the control protocol message, forwards the control protocol message to the service provider network, and
   the respective serving entity indicates an address of another serving entity in the bearer provider network in the control protocol message indicating the initiated call and sent to the service provider network, and the service provider network uses the other serving entity when routing the call towards the user equipment.

23. A system according to claim 22, wherein the service provider network, upon receiving the control protocol message sent from the respective serving entity, executes terminating services.

24. A system according to claim 22, wherein the respective serving entity indicates the address of the other serving entity by adding a parameter containing the address to a descriptor contained in the control protocol message indicating the initiated call which is sent towards the service provider network.

25. A system according to claim 22, wherein the respective serving entity indicates the address of the other serving entity by adding a control protocol header containing the address to the control protocol message indicating the initiated call which is sent towards the service provider network.

26. A method of communicating in an Internet Protocol communication system, the method comprising:
   offering services to users through a service provider network;
   providing call related functions to users using a bearer provider network, wherein the service provider network is an Internet Protocol network and the bearer provider network is an Internet Protocol Telephony provider network;
   separating the service provider network and the bearer provider network to allow the users to manage the services in a centralized maimer across multiple bearer provider networks;
   receiving a control protocol message by a respective serving entity in the bearer provider network;
   analyzing the received control protocol message by the respective serving entity;
   depending on the analyzing result, performing call related functions by the respective serving entity;
   analyzing a received control protocol message by the service provider network;
   depending on the analyzing result, executing services by the service provider network, wherein when a control protocol message indicating an initiated call to a user equipment is received in said receiving:
   analyzing the control protocol message;
   if a user identification address and a terminating call indication are present in the control protocol message, forwarding the control protocol message to the service provider network;
   receiving the control protocol message sent from a respective serving entity by the service provider network:
   executing terminating services by the service provider network; and
   indicating an address of another serving entity in the bearer provider network is in the control protocol message indicating the initiated call which is sent towards the service provider network, and the other serving entity is used by the service provider network when routing the call towards the user equipment.

27. A method according to claim 26, wherein, when in said receiving a control protocol message for registering a user equipment is received, the method further comprises:
   analyzing a user address in the control protocol message; and
   registering the user equipment to the bearer provider network in accordance with the user address.

28. A method according to claim 27, further comprising:
   receiving, from the user equipment, another control protocol message for registering the user equipment, by the service provider network;
   analyzing a service provider network user identification address in the control protocol message by the service provider network; and
   registering the user equipment to the service provider network in accordance with the service provider network user identification address.

29. A method according to claim 26, wherein, when a control protocol message for registering a user equipment is received in said receiving, the method further comprises:
   analyzing a user address in the control protocol message;
   registering the user equipment is registered to the bearer provider network in accordance with the user address;

fetching a service provider network user identification address related to the user address from a subscriber database in the bearer provider network;
generating a control protocol message with the service provider network user identification address; and
sending the control protocol message with the service provider network user identification address towards the service provider network for registering the user equipment to the service provider network.

30. A method according to claim 26, wherein, when a control protocol message for initiating a call is received in said receiving, the method further comprises:
analyzing the control protocol message; and
if a service provider network user identification address of a called party and an originating call indication are present in the control protocol message, forwarding the control protocol message to the service provider network.

31. A method according to claim 26, wherein, when a control protocol message for initiating a call is received in said receiving, the method further comprises:
analyzing the control protocol message; and
if a called party address is present in the control protocol message, fetching a service provider network user identification address related to the called party address from a subscriber database in the bearer provider network and a control protocol message with the service provider network user identification address and an originating call indication is sent towards the service provider network.

32. A method according to claim 31, further comprising:
adding a new control protocol header comprising the originating call indication to the control protocol message.

33. A method according to claim 26, further comprising:
indicating the address of the other serving entity by adding a parameter containing the address to a descriptor contained in the control protocol message indicating the initiated call which is sent towards the service provider network.

34. A method according to claim 26, further comprising:
indicating the address of the other serving entity by adding a control protocol header containing the address to the control protocol message indicating the initiated call which is sent towards the service provider network.

35. A method according to claim 26, wherein the control protocol comprises a session initiation protocol.

36. A method of communicating in an Internet Protocol communication system, the method comprising:
offering services to users through a service provider network;
providing call related functions to users using a bearer provider network, wherein the service provider network is an Internet Protocol network and the bearer provider network is an Internet Protocol Telephony provider network;
separating the service provider network and the bearer provider network to allow the users to manage the services in a centralized manner across multiple bearer provider networks;
receiving a control protocol message by a respective serving entity in the bearer provider network;
analyzing the received control protocol message by the respective serving entity;
depending on the analyzing result, performing call related functions by the respective serving entity;
analyzing a received control protocol message by the service provider network;
depending on the analyzing result, executing services by the service provider network wherein, when a control protocol message indicating an initiated call to a user equipment is received in said receiving;
analyzing the control protocol message;
if a user address is present in the control protocol message, fetching a service provider network user identification address related to the user address from a subscriber database in the bearer provider network and a control protocol message with the service provider network user identification address and a terminating call indication is sent towards the service provider network;
receiving the control protocol message sent from a respective serving entity by the service provider network:
executing terminating services by the service provider network; and
indicating an address of another serving entity in the bearer provider network is in the control protocol message indicating the initiated call which is sent towards the service provider network, and the other serving entity is used by the service provider network when routing the call towards the user equipment.

37. A method according to claim 36, further comprising:
indicating the address of the other serving entity by adding a parameter containing the address to a descriptor contained in the control protocol message indicating the initiated call which is sent towards the service provider network.

38. A method according to claim 36, further comprising:
indicating the address of the other serving entity by adding a control protocol header containing the address to the control protocol message indicating the initiated call which is sent towards the service provider network.

39. A method according to claim 36, further comprising:
adding a new control protocol header comprising the terminating call indication to the control protocol message sent towards the service provider network.

40. A serving entity in a bearer provider network providing call related functions to users and communicating with a service provider network offering services to users, wherein the service provider network is an Internet Protocol network and the bearer provider network is an Internet Protocol Telephony provider network, the service provider network being separate from the bearer provider network to allow the users to manage the services in a centralized manner across multiple bearer provider networks, wherein said serving entity is configured to receive a control protocol message, analyze the control protocol message, and, depending on the analyzing result, perform call related functions, wherein, when said serving entity receives a control protocol message indicating an initiated call to a user equipment, it analyzes the control protocol message, and, if a user identification address and a terminating call indication are present in the control protocol message, forwards the control protocol message to the service provider network, and wherein said serving entity indicates an address of another serving entity in the bearer provider network in the control protocol message indicating the initiated call and sent towards the service provider network.

41. A serving entity according to claim 40, wherein, when said serving entity receives, from a user equipment, a control protocol message for registering the user equipment, it analyzes a user address in the control protocol message, and registers the user equipment to the bearer provider network in accordance with the user address.

42. A serving entity according to claim 40, wherein, when said serving entity receives, from a user equipment, a control protocol message for registering the user equipment, it analyzes a user address in the control protocol message, registers the user equipment to the bearer provider network in accordance with the user address, fetches a service provider network user identification address related to the user address from a subscriber database in the bearer provider network and generates a control protocol message with the service provider network user identification address and sends it towards the service provider network for registering the user equipment to the service provider network.

43. A serving entity according to claim 40, wherein, when said serving entity receives, from a user equipment, a control protocol message for initiating a call, it analyzes the control protocol message and, if a service provider network user identification address of a called party and an originating call indication are present in the control protocol message, forwards the control protocol message to the service provider network.

44. A serving entity according to claim 40, wherein, when said serving entity receives, from a user equipment, a control protocol message for initiating a call, it analyzes the control protocol message and, if a called party address is present in the control protocol message, it fetches a service provider network user identification address related to the called party address from a subscriber database in the bearer provider network and sends a control protocol message with the service provider network user identification address and an originating call indication towards the service provider network.

45. A serving entity according to claim 44, wherein said serving entity adds a new control protocol header comprising the originating call indication to the control protocol message.

46. A serving entity according to claim 40, wherein said serving entity indicates the address of the other serving entity by adding a parameter containing the address to a descriptor contained in the control protocol message indicating the initiated call which is sent towards the service provider network.

47. A serving entity according to claim 40, wherein said serving entity indicates the address of the other serving entity by adding a control protocol header containing the address to the control protocol message indicating the initiated call which is sent towards the service provider network.

48. A serving entity according to claim 40, wherein the control protocol comprises a session initiation protocol.

49. A serving entity in a bearer provider network providing call related functions to users and communicating with a service provider network offering services to users, wherein the service provider network is an Internet Protocol network and the bearer provider network is an Internet Protocol Telephony provider network, the service provider network being separate from the bearer provider network to allow the users to manage the services in a centralized manner across multiple bearer provider networks, wherein said serving entity is configured to receive a control protocol message, analyze the control protocol message, and, depending on the analyzing result, perform call related functions, wherein, when said serving entity receives a control protocol message indicating an initiated call to a user equipment, it analyzes the control protocol message and, if a user address is present in the control protocol message, fetches a service provider network user identification address related to the user address from the subscriber database and sends a control protocol message with the service provider network user identification address and a terminating call indication towards the service provider network, and wherein said serving entity indicates an address of another serving entity in the bearer provider network in the control protocol message indicating the initiated call and sent towards the service provider network.

50. A serving entity according to claim 49, wherein said serving entity indicates the address of the other serving entity by adding a parameter containing the address to a descriptor contained in the control protocol message indicating the initiated call which is sent towards the service provider network.

51. A serving entity according to claim 49, wherein said serving entity indicates the address of the other serving entity by adding a control protocol header containing the address to the control protocol message indicating the initiated call which is sent towards the service provider network.

52. A serving entity according to claim 49, wherein said serving entity adds a new control protocol header comprising the terminating call indication to the control protocol message sent towards the service provider network.

53. A service provider network offering services to users and communicating with a bearer provider network providing call related functions to users, wherein the service provider network is an Internet Protocol network and the bearer provider network is an Internet Protocol Telephony provider network, the service provider network being separate from the bearer provider network to allow the users to manage the services in a centralized manner across multiple bearer provider networks, wherein said bearer provider network comprises a serving entity, wherein said serving entity receives a control protocol message indicating an initiated call to a user equipment, said serving entity analyzes the control protocol message, and, if a user identification address and a terminating call indication are present in the control protocol message, forwards the control protocol message to the service provider network, wherein the serving entity indicates an address of another serving entity in the bearer provider network in the control protocol message indicating an initiated call and sent towards the service provider network, and said service provider network is configured to receive the control protocol message, analyze the control protocol message and, depending on the analyzing result, execute services.

54. A service provider network according to claim 53, wherein said service provider network is configured to receive control protocol messages from said serving entity in the bearer provider network.

55. A service provider network according to claim 54, wherein, when said service provider network receives, from said serving entity, the control protocol message indicating the initiated call towards the user equipment, said service provider network executes terminating services.

56. A service provider network according to claim 55, wherein, if the address of the other serving entity in the bearer provider network is indicated in the control protocol message, said service provider network uses the other serving entity when routing the call towards the user equipment.

57. A service provider network according to claim 53, wherein said service provider network is configured to receive control protocol messages from the user equipment.

58. A service provider network according to claim 57, wherein, when said service provider network receives, from the user equipment, a control protocol message for registering the user equipment, it analyzes a service provider network user identification address in the control protocol message, and registers the user equipment to the service provider network in accordance with the service provider network user identification address.

59. A service provider network according to claim 53, wherein the control protocol comprises a session initiation protocol.

* * * * *